(12) United States Patent
Kobayashi (10) Patent No.: US 10,983,424 B2
(45) Date of Patent: Apr. 20, 2021

(54) IMAGE PROJECTION APPARATUS AND STORAGE MEDIUM CAPABLE OF ADJUSTING CURVATURE AMOUNT OF IMAGE PLANE

(71) Applicant: CANON KABUSHIKI KAISHA, Tokyo (JP)

(72) Inventor: Keisuke Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/379,941

(22) Filed: Apr. 10, 2019

(65) Prior Publication Data

US 2019/0313066 A1    Oct. 10, 2019

(30) Foreign Application Priority Data

Apr. 10, 2018    (JP) .............................. JP2018-075098

(51) Int. Cl.
*G03B 21/14*    (2006.01)
*H04N 9/31*    (2006.01)
*G03B 21/20*    (2006.01)
*G06F 9/30*    (2018.01)

(52) U.S. Cl.
CPC .......... *G03B 21/147* (2013.01); *G03B 21/142* (2013.01); *G03B 21/206* (2013.01); *G06F 9/3004* (2013.01); *H04N 9/3152* (2013.01)

(58) Field of Classification Search
CPC ............................. G03B 21/142; G03B 21/147
See application file for complete search history.

(56) References Cited

U.S. PATENT DOCUMENTS

| | | | | |
|---|---|---|---|---|
| 6,592,228 B1* | 7/2003 | Kawashima | ........... | G03B 21/11 348/745 |
| 6,956,702 B2* | 10/2005 | Pate | ........... | G02B 5/289 348/E9.027 |
| 7,830,604 B2* | 11/2010 | Inoko | ........... | G02B 27/0068 359/557 |
| 7,866,823 B2* | 1/2011 | Asai | ........... | G03B 21/142 353/52 |
| 7,972,018 B2* | 7/2011 | Sajadi | ........... | G03B 3/00 353/101 |
| 8,287,140 B2* | 10/2012 | Fujimaki | ........... | G03B 5/04 353/100 |

(Continued)

FOREIGN PATENT DOCUMENTS

| | | |
|---|---|---|
| JP | 2011145580 A | 7/2011 |
| JP | 2013109186 A | 6/2013 |
| JP | 2014235217 A | 12/2014 |

*Primary Examiner* — Bao-Luan Q Le
(74) *Attorney, Agent, or Firm* — Carter, DeLuca & Farrell LLP (57) ABSTRACT

An image projection apparatus configured to project a projection image on a projected surface via a projection optical system that includes a first optical system capable of adjusting a curvature amount of an image plane and is interchangeably attached to the image projection apparatus includes an acquirer configured to acquire information on a reference position of the first optical system, and a controller configured to move the first optical system to the reference position when detecting an interchange of the projection optical system or when accepting an instruction from a user.

10 Claims, 4 Drawing Sheets

(56) References Cited

U.S. PATENT DOCUMENTS

| | | | | |
|---|---|---|---|---|
| 8,702,243 B2* | 4/2014 | Ishii | | H04N 9/3185 |
| | | | | 353/69 |
| 8,905,557 B2* | 12/2014 | Kano | | G03B 21/54 |
| | | | | 353/101 |
| 9,128,360 B2* | 9/2015 | Kano | | G03B 21/147 |
| 9,261,758 B2* | 2/2016 | Kuwata | | G03B 21/142 |
| 9,843,781 B1* | 12/2017 | Furui | | G02B 7/14 |
| 9,936,179 B2* | 4/2018 | Matsuno | | G03B 21/142 |
| 9,961,318 B2* | 5/2018 | Ichieda | | H04N 9/3185 |
| 10,036,940 B2* | 7/2018 | Tanaka | | G02B 27/0025 |
| 10,109,223 B2* | 10/2018 | Mitsuhashi | | G09G 3/001 |
| 10,180,560 B2* | 1/2019 | Takehana | | G02B 7/10 |
| 10,250,859 B2* | 4/2019 | Furui | | H04N 5/23203 |
| 10,298,894 B2* | 5/2019 | Ichieda | | G02B 15/14 |
| 10,460,424 B2* | 10/2019 | Narimatsu | | G06T 5/006 |
| 10,466,574 B2* | 11/2019 | Kobayashi | | G03B 21/28 |
| 10,503,056 B2* | 12/2019 | Kudo | | H04N 9/3194 |
| 10,571,784 B2* | 2/2020 | Hatano | | G02B 15/163 |
| 10,638,103 B2* | 4/2020 | Kobayashi | | H04N 9/3185 |
| 10,656,505 B2* | 5/2020 | Takehana | | G03B 21/142 |
| 10,782,510 B2* | 9/2020 | Mori | | H04N 9/317 |
| 2007/0252955 A1* | 11/2007 | Asai | | G03B 21/142 |
| | | | | 353/69 |
| 2009/0009878 A1* | 1/2009 | Inoko | | G02B 13/16 |
| | | | | 359/649 |
| 2010/0195063 A1* | 8/2010 | Fujimaki | | G03B 5/04 |
| | | | | 353/101 |
| 2010/0214540 A1* | 8/2010 | Sajadi | | G03B 3/00 |
| | | | | 353/101 |
| 2011/0096301 A1* | 4/2011 | Koyama | | G03B 21/2033 |
| | | | | 353/88 |
| 2011/0292351 A1* | 12/2011 | Ishii | | H04N 9/3185 |
| | | | | 353/69 |
| 2012/0218528 A1* | 8/2012 | Kano | | G03B 21/142 |
| | | | | 353/101 |
| 2014/0340654 A1* | 11/2014 | Kuwata | | G03B 21/142 |
| | | | | 353/69 |
| 2015/0070664 A1* | 3/2015 | Kano | | G03B 21/54 |
| | | | | 353/101 |
| 2016/0044289 A1* | 2/2016 | Matsuno | | G02B 15/15 |
| | | | | 348/745 |
| 2017/0124926 A1* | 5/2017 | Mitsuhashi | | G09G 3/001 |
| 2017/0208307 A1* | 7/2017 | Ichieda | | H04N 9/3194 |
| 2017/0293210 A1* | 10/2017 | Shimizu | | G03B 21/142 |
| 2017/0339382 A1* | 11/2017 | Furui | | H04N 5/23203 |
| 2018/0017758 A1* | 1/2018 | Takehana | | G02B 7/10 |
| 2018/0033123 A1* | 2/2018 | Narimatsu | | G03B 21/142 |
| 2018/0046068 A1* | 2/2018 | Hatano | | G03B 21/208 |
| 2018/0070063 A1* | 3/2018 | Furui | | G02B 7/14 |
| 2018/0101086 A1* | 4/2018 | Tanaka | | G02B 27/0068 |
| 2018/0217351 A1* | 8/2018 | Shiraishi | | G03B 3/12 |
| 2018/0220116 A1* | 8/2018 | Ichieda | | H04N 5/247 |
| 2018/0262728 A1* | 9/2018 | Kobayashi | | G03B 21/142 |
| 2018/0343424 A1* | 11/2018 | Kudo | | G03B 21/142 |
| 2019/0137853 A1* | 5/2019 | Takehana | | G02B 7/021 |
| 2019/0361208 A1* | 11/2019 | Mori | | G02B 5/003 |
| 2020/0204767 A1* | 6/2020 | Nakamura | | G09G 5/00 |

\* cited by examiner

IMAGE PROJECTION APPARATUS AND STORAGE MEDIUM CAPABLE OF ADJUSTING CURVATURE AMOUNT OF IMAGE PLANE

BACKGROUND OF THE INVENTION

Field of the Invention

The present invention relates to an image projection apparatus and storage medium, each of which can adjust a field curvature amount.

Description of the Related Art

An image projection apparatus, such as a projector, displays a projection image by projecting modulated light (image light) onto a screen, and provides focusing in order to focus the projection image. Usually, the projection optical system is designed to make flat an image plane so as to focus the entire projection image when confronting a flat screen. However, the image plane may be curved due to the manufacturing error or the like. Thus, one proposed image projection apparatus has a field curvature adjusting function for reducing a field curvature through an adjustment by a user. The field curvature adjustment function that intentionally curves the image plane has recently been used for an application of focusing the entire projection image, not only for the flat screens, but also for a screen having a curvature, such as a concave surface and a convex surface. Japanese Patent Laid-Open No. ("JP") 2011-145580 discloses a projector that adjusts a field curvature by changing a distance between lens units.

In the image projection apparatus that enables the projection optical system to be interchanged, the projection optical system having the field curvature adjusted in the previous use may be again attached. Then, since the projection starts with the curved image plane, the user may be confused and the user needs to adjust the field curvature. Depending on the combination of the projection optical system and the image projection apparatus body, the relative position between the projection optical system and the display panel may shift from the expected value due to the manufacturing error, the assembly error, or the like, and the image plane may be curved. JP 2011-145580 does not disclose any measures against this problem.

SUMMARY OF THE INVENTION

The present invention provides an image projection apparatus and a storage medium, each of which can be comfortably used after a projection optical system is interchanged.

An image projection apparatus according to one aspect of the present invention is configured to project a projection image on a projected surface via a projection optical system that includes a first optical system capable of adjusting a curvature amount of an image plane and is interchangeably attached to the image projection apparatus. The image projection apparatus includes an acquirer configured to acquire information on a reference position of the first optical system, and a controller configured to move the first optical system to the reference position when detecting an interchange of the projection optical system or when accepting an instruction from a user.

A non-transitory computer-readable storage medium according to another aspect of the present invention stores a program used for a computer in an image projection apparatus configured to project a projection image on a projected surface via a projection optical system that includes a first optical system capable of adjusting a curvature amount of an image plane and is interchangeably attached to the image projection apparatus. The program enables the computer to execute a method comprising the steps of acquiring information on a reference position of the first optical system, and moving the first optical system to the reference position when detecting an interchange of the projection optical system or when accepting an instruction from a user.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Those elements in respective figures will be designated by the same reference numerals, and a duplicate description thereof will be omitted.

Figure 1:
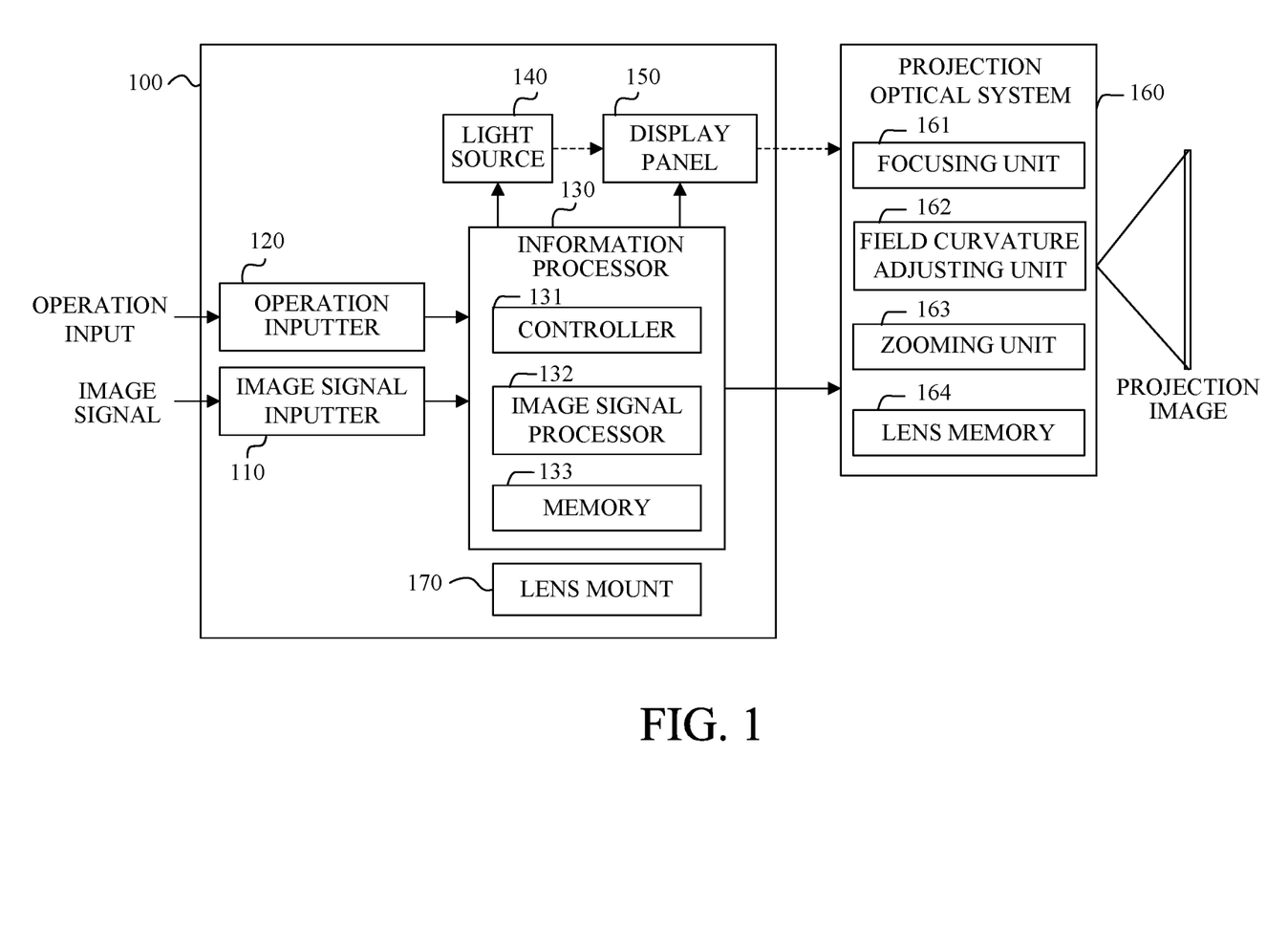
FIG. 1 is a block diagram of a projector as an image projection apparatus according to one embodiment of the present invention.

FIG. 1 is a block diagram of a projector 100 as an image projection apparatus according to one embodiment of the present invention. The projector 100 includes an image signal inputter 110, an operation inputter 120, an information processor 130, a light source 140, a display panel 150, and a lens mount 170. A projection optical system 160 is attached to the projector 100. The projector 100 is configured so that different types of projection optical systems can be interchangeably attached to it via the lens mount 170.

The image signal inputter 110 has terminals for receiving signals by wired communications and a receiver for receiving signals by radio communications, and receives an input image signal, such as a composite image signal, a DVI image signal and an HDMI image signal, from the outside. The input image signal input to the image signal inputter 110 is sent to the information processor 130.

The operation inputter 120 has an operation member such as a button operated by a user and a remote control receiver that receives an optical signal (remote control signal) from a remote controller for remotely operating the projector 100, and outputs an operation signal in response to the reception of the user operation or remote control signal. The operation signal instructs the power on and off, a selection of a projection mode, a shift direction (up and down, right and left) of a projection image, etc.

The information processor 130 includes a controller 131, an image signal processor 132, and a memory (lens information memory, reference position memory) 133. The controller 131 includes a CPU and a memory that stores a control program executed by the CPU, and can control a variety of operations of the projector 100 in accordance with an operation signal from the operation inputter 120. The controller 131 serves as an interchange detector and detects an interchange of the projection optical system 160. For example, the controller 131 may detect the interchange by receiving the interchange signal from the lens mount 170.

Alternatively, the interchange may be detected by determining whether identification information (information on the projection optical system) read out of the projection optical system 160 is different from the identification information stored in the memory 133. When the lens memory 164 stores the identification information of the projection optical system 160, the controller 131 may read the identification information out of the lens memory 164. The controller 131 reads the identification information out of the projection optical system 160 whenever the projector 100 is used (the projector 100 is powered on), and stores the read identification information in the memory 133. Whenever the electric contact is short-circuited or released according to the type of the lens on the projection optical system 160 side, the controller 131 may acquire the identification information by confirming the information of the electric contact. The image signal processor 132 performs image processing such as the brightness correction, the contrast correction, the gamma conversion, the color conversion, and the resolution conversion, for the input image signal. The image signal processor 132 generates a panel driving signal for the display panel 150 based on the processed image signal. The memory 133 includes a nonvolatile memory such as an EEPROM and a flash memory, and stores various information necessary for the operation of the projector 100.

The light source 140 includes a lamp, a laser diode, an LED, or the like, and emits white light. The white light is separated into R, G, and B light beams by an unillustrated color separation optical system and guided to the display panel 150. Alternatively, the white light may be separated into the R, G and B light beams in a time division manner.

For example, the display panel 150 includes three liquid crystal panels (transmissive or reflective liquid crystal panels) having 1920×1080 (full HD) modulated pixels and corresponding to R, G, and B light beams, and modulates the R, G and B light beams incident on each modulated pixel in response to the panel driving signal. The modulated R, G, and B light beams are combined by an unillustrated color combining optical system, and then projected onto the screen (projected surface) via the projection optical system 160. Thereby, a projection image is displayed on the screen. In separating the R, G, and B light beams in the time division manner, a single display panel may be controlled in the time division manner.

The projection optical system 160 has a focusing unit 161 (focus optical system), a field curvature adjustment unit (first optical system) 162, a zooming unit 163, and a lens memory 164. The focusing unit 161, the field curvature adjustment unit 162, and the zooming unit 163 are lens units (or group) including one or more lenses. Each lens unit is connected to a motor and an encoder (position detector), and driven based on a driving signal from the controller 131. In other words, the controller 131 serves as a drive controller. Driving the focusing unit 161 can provide focusing that moves the focused position of the projected surface (image plane) along the optical axis in the projection optical system 160. This embodiment will describe as an image plane a plane including the center position of the depth of field based on the projection optical system 160. The depth of field is a range that can be considered simultaneously focused at positions before and after the in-focus position. Driving the field curvature adjustment unit 162 bends the image plane in a concave shape or a convex shape around the optical axis of the projection optical system 160, and adjusts the field curvature or the curvature degree (curvature amount). The field curvature adjustment can make flat the image plane by canceling the field curvature. Driving the zooming unit 163 can change the angle of view of the projection light and provide zooming that optically zooms (enlarges or reduces) the projection image displayed on the screen. This embodiment makes the zooming unit 163 serve as zooming, but the present invention is not limited to this embodiment. For example, the zooming configuration that electronically scales a projection image may be used. More specifically, it is possible to change the modulation area by the display panel 150 or to change the size of the projection image by the image signal processor 132. The lens memory 164 includes a nonvolatile memory such as an EEPROM or a flash memory, and stores various information on the projection optical system 160.

The lens mount 170 is a lens mounting mechanism to which the projection optical system 160 is interchangeably (detachably) attached. Interchanging the projection optical system 160 can change the angle of view, the resolution performance, etc. according to the application.

Figure 2:
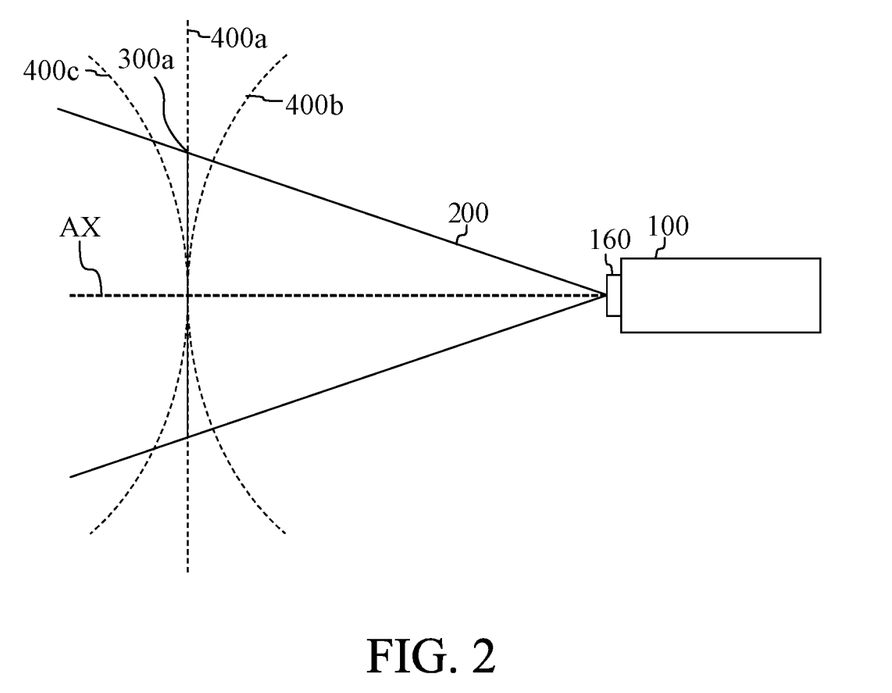
FIG. 2 illustrates a change in an image plane in the projection optical system.

Next follows a description of the field curvature adjustment. FIG. 2 is a side view of the projector 100, and illustrates a change of the image plane of the projection optical system 160. The projector 100 can project the projection light 200 via the projection optical system 160. The projection light 200 is modulated light or image light, and becomes the projection image displayed on the screen when projected on the screen. An image plane 400a indicates a plane focused on the projection image. When a plane screen is located at a position corresponding to the image plane 400a, the projection image 300a is displayed while entirely focused on the screen. A large positional shift between the image plane 400a and the screen causes a defocus of the projection image.

In general, the image plane of the projection optics is designed to be flat so that the projection image can be focused on the flat screen. However, the lens shifts from the designed position due to the manufacturing error, the assembly error, or the like, and the image plane is curved. Then, the image plane is curved in a concave shape or a convex shape like the image plane 400b or 400c relative to the expected flat image plane 400a, and the periphery of the projection image may be defocused. The image plane 400b and 400c are actually curved surfaces curved in a bowl shape. In such a case, the field curvature adjustment that cancels the field curvature can change the image plane 400b and 400c into the image plane 400a and focus the entire projection image. On the other hand, in focusing the projection image on a curved screen such as a dome shape, the flat image plane enables only part of the projection image to be focused. Then, the field curvature adjustment that intentionally bends the image plane can focus a wider area of the projection image.

Figure 3:
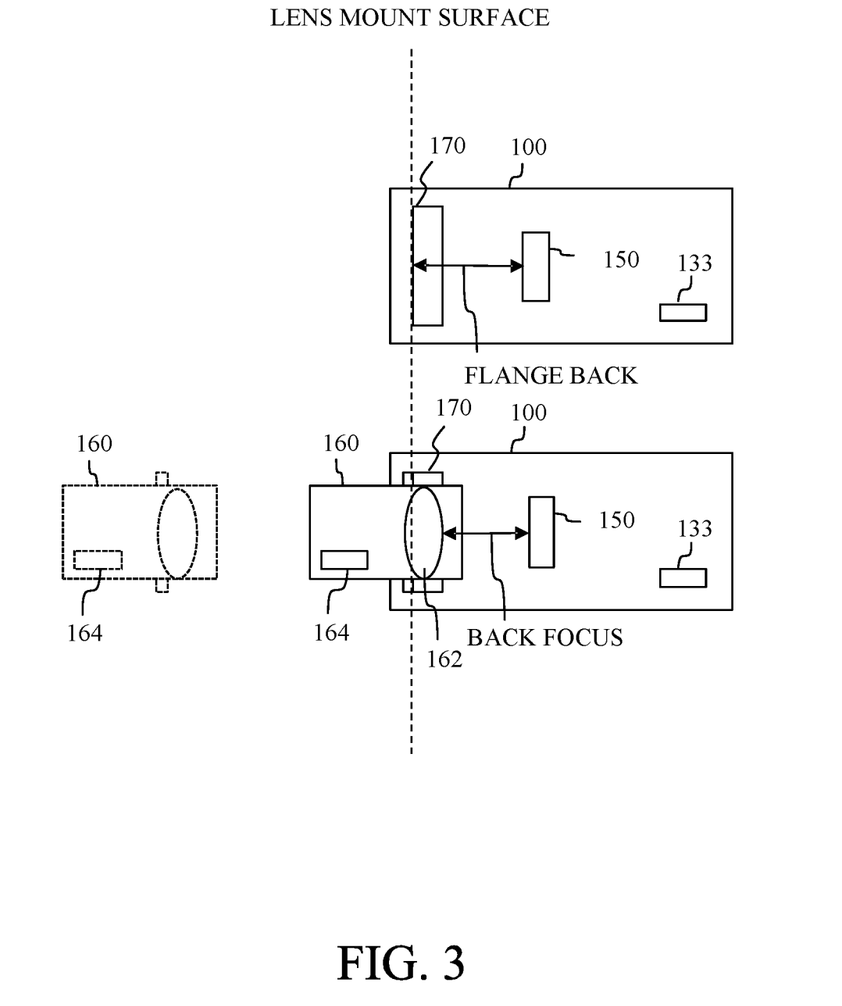
FIG. 3 is a side view of the projector.

Next follows a description of an outline of the operation of the projector 100 according to this embodiment when the projection optical system 160 is interchanged. FIG. 3 is a side view of the projector 100. Assume that the field curvature was adjusted when the projection optical system 160 was used last time. Then, the field curvature adjustment unit 162 remains the position adjusted last time or the position that makes the image plane curved. If the projection of the projector 100 starts with the flat screen in that state, the curved image plane (that enables only part of the plane screen to be focused) may confuse the user. In order to make the image plane flat (to focus the plane screen or to reduce the field curvature), it is necessary for the user to adjust the field curvature.

Thus, according to this embodiment, upon detecting the interchange of the projection optical system, the controller 131 acquires information on the position (reference position) of the field curvature adjustment unit 162 that makes flat the image plane, and moves the field curvature adjustment unit 162 to the reference position. Thereby, even when the projection optical system 160 is interchanged, the projection can be started with the flat image plane and the user can comfortably use the projector 100. The reference position is different for each projection optical system, and the information on the reference position may be more specifically information indicating the reference position. For example, it may be the value of the encoder when the field curvature adjustment unit 162 is located at the reference position, or a control amount from the reference physical position (such as the drive limit position of the field curvature adjustment unit 162). This embodiment stores the information on the reference position in the lens memory 164.

In this embodiment, the controller 131 moves the field curvature adjustment unit 162 to the reference position when detecting the interchange of the projection optical system 160, but the present invention is not limited to this embodiment. For example, the initialization setting of the field curvature adjustment may be added to the setting menu of the projector 100, and the controller 131 may move the field curvature adjustment unit 162 to the reference position at the timing specified by the user. Thereby, the user can make flat the image plane without visually confirming the focus of the projection image. When the field curvature adjustment unit 162 is moved to the reference position by the instruction of the user, there is no need to detect the interchange of the projection optical system 160 and the image plane can be made flat with a simpler configuration.

This embodiment stores the information on the reference position in the lens memory 164, but may store it in the memory 133. Then, the memory 133 previously stores the designed value derived in the optical design for each of the plurality of projection optical systems, the controller 131 acquires only identification information from the projection optical system 160 and the reference position based on the identification information from the memory 133. The lens memory 164 may store designed values or may store measurement values (reference positions) for individuals in order to make the image plane flat more accurately. For example, the measurement value, for example, in assembly may be obtained by measuring a position that provides the flat image plane while the projection optical system is attached to a master projector as a reference.

In the projector 100 to which the projection optical system 160 is interchangeably attached, the distance (flange back) between the lens mount 170 (lens mount surface) and the display panel 150 may shift from the designed value due to the manufacturing error or assembly error. Then, the back focus and the distance between the display panel 150 and the field curvature adjustment unit 162 also shift from the designed values, and thus even if the field curvature adjustment unit 162 is moved to the reference position as described above, the field curvature may occur. Then, in order to make flat the image plane, it is necessary for the user to visually make flat the image plane.

Accordingly, this embodiment stores the correction information on the field curvature caused by the projector 100 in the memory 133, and the controller 131 calculates the moving amount of the field curvature adjustment unit 162 based on the correction information. Thereby, when the projection optical system 160 is interchanged, the projection can be started with the flat image plane irrespective of the manufacturing error or the like of the projector 100. The correction information may be a shift amount from the designed value caused by the projector 100 more specifically a shift amount from the designed value of each part of the projector 100, such as a shift amount from the designed value of the flange back, or the moving amount of the field curvature adjustment unit 162 corresponding to the shift amount. The memory 133 may store the relationship between the moving amount of the field curvature adjustment unit 162 and the reduction amount of the field curvature measured by mounting the master lens onto the projector 100 in assembly. Thereby, the field curvature can be easily reduced based on the manufacturing error etc. of each component.

As described above, this embodiment can accurately reduce the field curvature caused by the projection optical system 160 and the projector 100 when the projection optical system 160 is interchanged, so that the user can comfortably use the projector 100.

Figure 4:
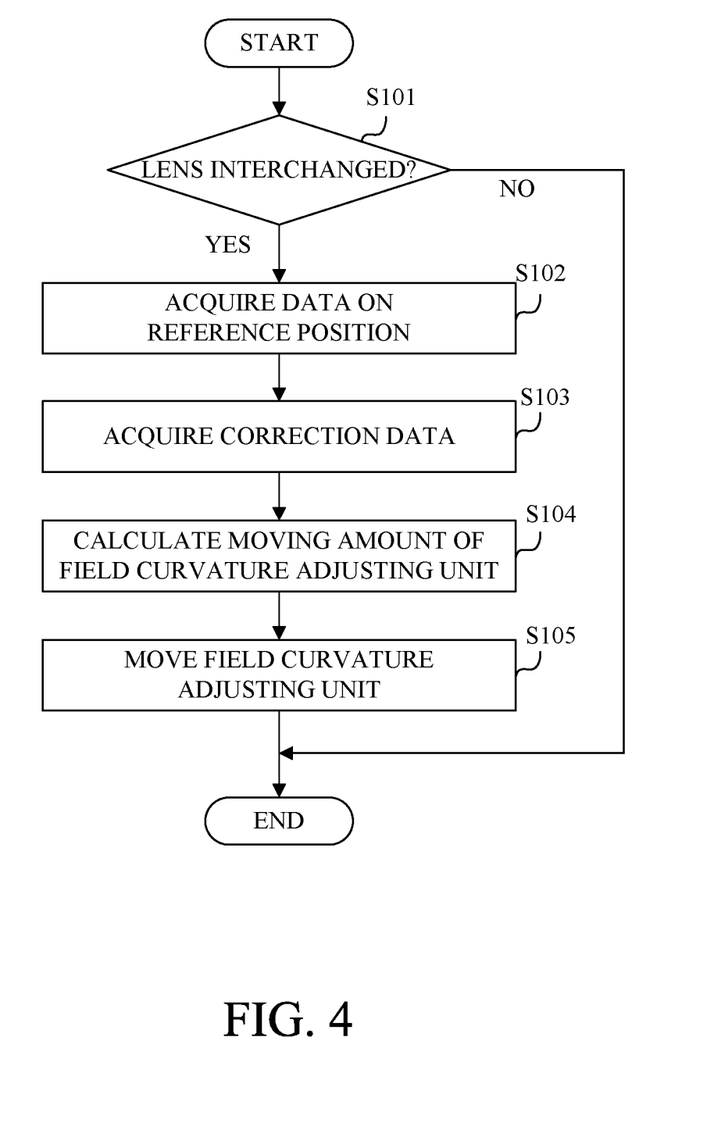
FIG. 4 is a flowchart of control processing.

Referring now to FIG. 4, a description will be given of control processing executed by the controller 131. FIG. 4 is a flowchart illustrating the control processing.

In the step S101, the controller 131 determines whether or not the projection optical system 160 has been interchanged. When the projection optical system 160 is interchanged, the flow proceeds to the step S102, and when the projection optical system 160 is not interchanged, this flow is terminated.

In the step S102, the controller 131 acquires information on the reference position from the lens memory 164.

In the step S103, the controller 131 acquires the correction information on the field curvature corresponding to the projector 100 from the memory 133.

In the step S104, the controller 131 calculates the moving amount of the field curvature adjustment unit 162 based on the information on the reference position acquired in the step S102 and the correction information acquired in the step S103.

In the step S105, the controller 131 moves the field curvature adjustment unit 162 based on the correction amount calculated in the step S104.

When the projection optical system 160 is interchanged, the above processing can accurately reduce the field curvature (or make flat the image plane), so that the user can comfortably use the projector 100.

In the step S101, the field curvature is reduced in response to the interchange of the projection optical system 160 as a trigger, but the present invention is not limited to this embodiment. When each of the lens units corresponding to the focusing and the zooming is moved, the field curvature may occur due to a combination of the projection optical system 160 and the projector 100, a manufacturing error, or the like. Accordingly, the field curvature may be reduced by using a positional change of each lens unit in focusing or zooming as a trigger. In this case, the correction information necessary to reduce the field curvature corresponding to the position of each lens unit acquired by the encoder may be stored in the lens memory 164, and considered in the calculation of the moving amount in the step S104. Moving the field curvature adjustment unit 162 by the calculated moving amount can reduce the field curvature even when each lens unit changes its position. In addition, the field curvature may be reduced by using the instruction of the user as a trigger. When the field curvature adjustment unit 162 is moved in accordance with the instruction of the user, there is no need to detect the interchange of the projection optical system 160 and the image plane can be made flat with a simpler configuration.

When at least one of the temperature of the projection optical system 160 and the temperature of the field curvature adjustment unit 162 changes, the optical characteristic may change and the field curvature may occur. Accordingly, the field curvature may be reduced by using a temperature change as a trigger of at least one of the projection optical system 160 and the field curvature adjustment unit 162. More specifically, a temperature detector configured to detect at least one of the temperature of the projection optical system 160 and the temperature of the field curvature adjustment unit 162 is provided to the projection optical system 160, and the field curvature may be reduced in accordance with the detection result detected by the temperature detector. Then, the correction information necessary to reduce the field curvature in accordance with the temperature change in at least one of the projection optical system 160 and the field curvature adjustment unit 162 may be stored in the lens memory 164, and may be considered in the calculation of the moving amount in the step S104. The field curvature can be reduced even when at least one of the temperature of the projection optical system 160 and the temperature of the field curvature adjustment unit 162 is changed by moving the field curvature adjustment unit 162 by the calculated moving amount.

In the step S103, the controller 131 acquires the correction information, but it is not always necessary to acquire the correction information. Even in that case, the field curvature can be accurately reduced by moving the field curvature adjustment unit 162 to the reference position acquired in the step S102, even when the projection optical system 160 is interchanged.

In the step S104, the controller 131 may obtain the position of each lens unit from the encoders connected to the respective lens units, calculate the moving amount of the field curvature adjustment unit 162 based on the position information of each lens unit. The controller 131 may calculate the moving amount of the field curvature adjustment unit 162 based on the detection result of the temperature detector that detects at least one of the temperature of the projection optical system 160 and the temperature of the field curvature adjustment unit 162 provided in the projection optical system 160.

This embodiment provides the controller 131 that moves the field curvature adjustment unit 162 to the reference position to the projector 100, but may provide it to the projection optical system 160.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-75098, filed on Apr. 10, 2018, which is hereby incorporated by reference herein in its entirety.

What is claimed is:

1. An image projection apparatus configured to project a projection image on a projected surface via a projection optical system that includes a first optical system capable of adjusting a curvature amount of an image plane and is interchangeably attached to the image projection apparatus, the image projection apparatus comprising:
   an acquirer configured to acquire information on a reference position of the first optical system; and
   a controller configured to move the first optical system to the reference position when detecting an interchange of the projection optical system or when accepting an instruction from a user,
   wherein the controller moves the first optical system in an optical axis direction during adjusting the curvature amount of the image plane, and
   wherein the controller moves the first optical system to a corrected reference position based on the information on the reference position depending on the projection optical system and correction information for correcting the reference position depending on the image projection apparatus.

2. The image projection apparatus according to claim 1, wherein the reference position is a position of the first optical system that makes flat the image plane.

3. The image projection apparatus according to claim 1, further comprising a memory configured to store information on the projection optical system,
   wherein the controller acquires the information on the projection optical system from the projection optical system, and detects the interchange of the projection optical system when the information acquired from the projection optical system is different from that stored in the memory.

4. The image projection apparatus according to claim 1, further comprising a memory configured to store information on the reference position of the first optical system,
   wherein the controller acquires the information on the reference position of the first optical system from the memory and moves the first optical system to the reference position based on acquired information.

5. The image projection apparatus according to claim 1, wherein the controller acquires information on the reference position from the first optical system and moves the first optical system to the reference position based on acquired information.

6. The image projection apparatus according to claim 1, further comprising a memory configured to store the correction information,
- wherein the controller acquires the correction information from the memory.

7. The image projection apparatus according to claim 1, further comprising a position detector configured to detect a position of the first optical system,
- wherein the controller moves the first optical system to the reference position when the position detector detects a change in the position of the first optical system.

8. The image projection apparatus according to claim 1, further comprising a temperature detector configured to detect a temperature of at least one of the projection optical system and the first optical system,
- wherein the controller moves the first optical system to the reference position based on the temperature.

9. A non-transitory computer-readable storage medium storing a program used for a computer in an image projection apparatus configured to project a projection image on a projected surface via a projection optical system that includes a first optical system capable of adjusting a curvature amount of an image plane and is interchangeably attached to the image projection apparatus, the program enabling the computer to execute a method comprising the steps of:
- acquiring information on a reference position of the first optical system; and
- moving the first optical system to the reference position when detecting an interchange of the projection optical system or when accepting an instruction from a user,
- wherein the first optical system is moved in an optical axis direction during adjusting the curvature amount of the image plane,
- wherein the first optical system is moved to a corrected reference position based on the information on the reference position depending on the projection optical system and correction information for correcting the reference position depending on the image projection apparatus.

10. The image projection apparatus according to claim 1,
- wherein the projection optical system further includes a focus optical system capable of adjusting a focus, and
- wherein the controller moves the focus optical system during adjusting the focus.

\* \* \* \* \*